April 9, 1935. G. G. ROYER 1,996,881
MEANS FOR REGULATING THE TEMPERATURE IN EXPLOSION MOTORS
Filed Nov. 4, 1932 3 Sheets-Sheet 1
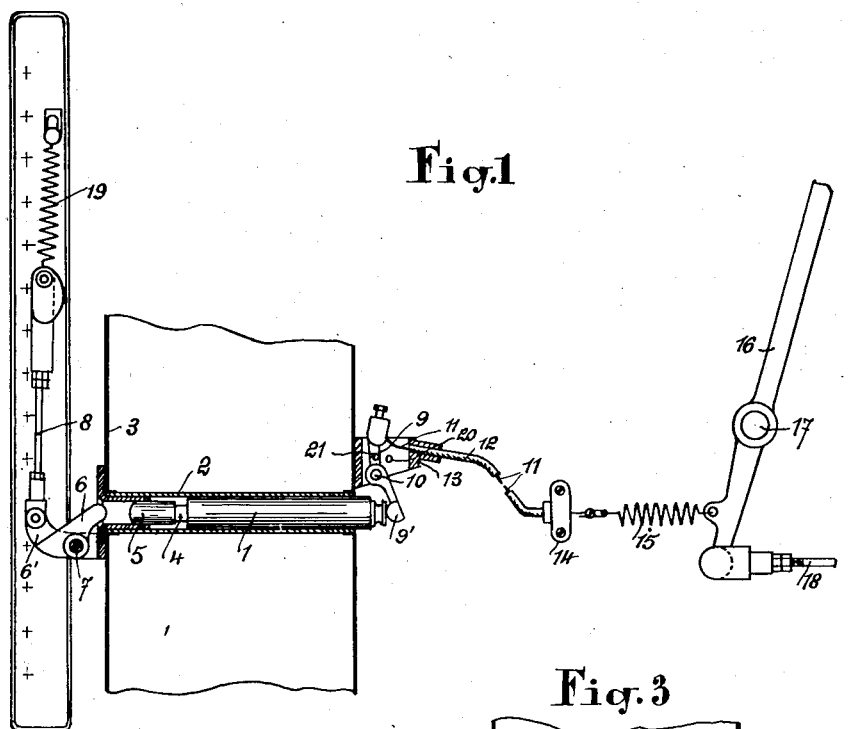
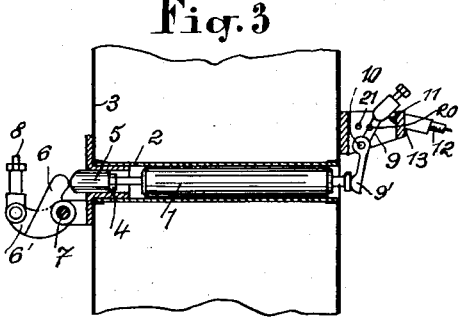
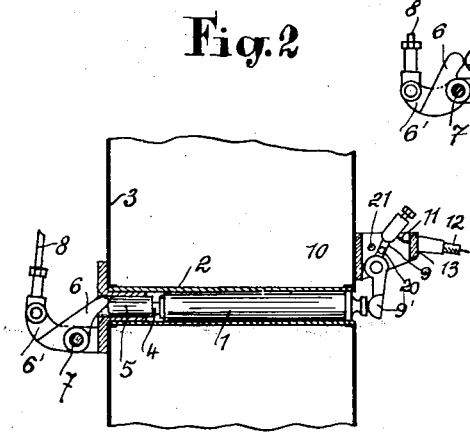
Inventor,
Georges G. Royer,
By Sommers + Young, attys

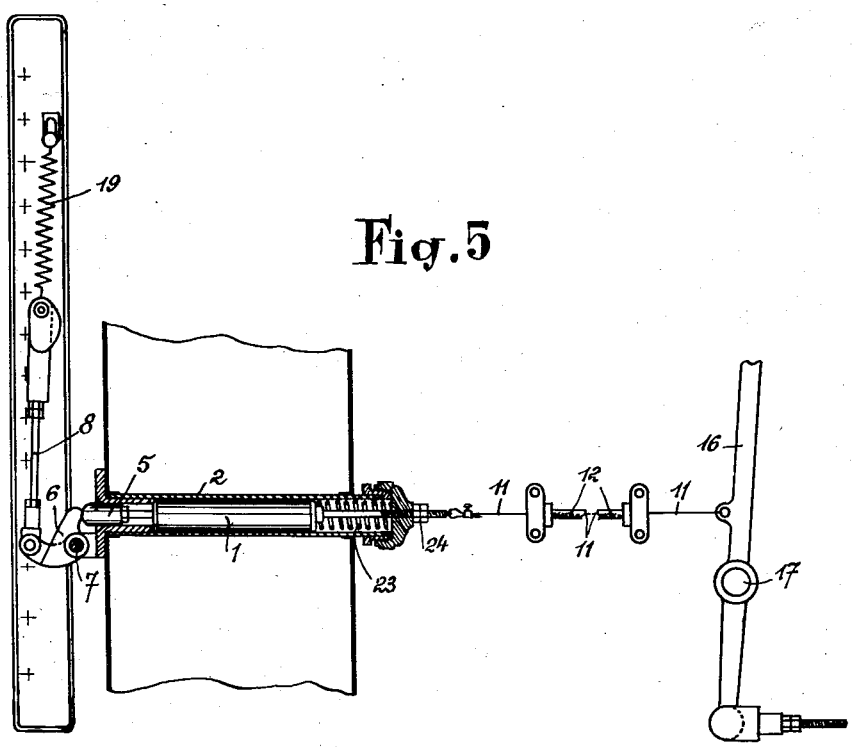

April 9, 1935. G. G. ROYER 1,996,881
MEANS FOR REGULATING THE TEMPERATURE IN EXPLOSION MOTORS
Filed Nov. 4, 1932 3 Sheets-Sheet 3

Inventor
Georges G. Royer.
By Sommers & Young attys

Patented Apr. 9, 1935

1,996,881

UNITED STATES PATENT OFFICE 1,996,881

MEANS FOR REGULATING THE TEMPERATURE IN EXPLOSION MOTORS

Georges Gaston Royer, Paris, France

Application November 4, 1932, Serial No. 641,314
In France November 19, 1931

4 Claims. (Cl. 123—174)

It has heretofore been proposed to regulate the temperature of explosion motors particularly in motor cars by means of movable shutters, having an angle of incidence which may be varied so as to insure a more or less intense cooling of the radiator in which the cooling water circulates these shutters being placed in front of said radiator.

These shutters were originally actuated by hand from a distance by the intermediary of a suitable system of rods. Now this arrangement requires a special handling on the part of the driver and if it is omitted there is danger of jamming on the part of the motor which is not then sufficiently cold; on the other hand the adjustment of the incidence of the shutters is quite arbitrary and consequently only varies at the driver's will.

It has also been proposed to utilize a thermostat immersed for example in the water contained in the radiator to effect the adjustment of the shutters in function of the water temperature, in that case the opening and the closing of the shutters is operated automatically and progressively, but their closing (when the vehicle stops for example) being always very slow it follows that the motor has evacuated most of its calories before the shutters are completely closed, it is therefore necesary to heat it there and then before the necessary power for starting has been produced, this resulting in a loss of time and carburant.

It has then been thought to utilize the pressure of the lubricating oil or the partial vacuum produced by the motor exhaust for previously adjusting the position of the thermostat and put the latter in proper condition for controlling the shutters or on the contrary bringing it back to the position of rest.

In the first case, as long as the motor is relatively cold, the oil pressure is sufficiently high to effect this previous adjustment of the thermostat, but as soon as the motor has reached its normal temperature the oil pressure decreases considerably and has no longer the power required to maintain the thermostat in its operative position, this may result in an ill-timed closing of the shutters and jamming of the motor which is not sufficiently cold. This arrangement requires an additional oil piping which may become the source of serious disturbances considering the continuous vibrations to which the radiator is exposed.

In the second case, when the motor is idling the partial vacuum produced by suction is largely sufficient to effect this previous adjustment of the position of the thermostat. But as soon as the speed increases, the partial vacuum decreases until it becomes practically nil (when the car drives up a hill in direct coupling for example) consequently at the moment when the motor gives out the highest number of calories and requires the greatest possible cooling, said partial vacuum is not then sufficient to maintain the thermostat in its operative position, the shutter closes and there is danger of the motor jamming.

The object of my invention is to avoid these drawbacks, consequently means are provided so that when the vehicle stops the shutters close immediately to keep in the calories, and that when the vehicle starts they are ready to open as soon as the temperature of the water contained in the radiator requires it.

It has been thought advisable to this end to first construct the body of the movable thermostat in such a manner that it may occupy two different positions, that is one in which its operation may act positively upon the control of the shutters and the other in which its operation is without positive effect upon said control; in the first case, it may be said that the thermostat is "in circuit" and in the second case that it is "out of circuit". Now the displacement of the thermostat body from its position "in circuit" to that "out of circuit" and inversely, is brought about directly by an operation that the driver must perform when starting and stopping his carriage, such as applying or releasing the hand brake lever, or else opening and shutting the ignition circuit, or the carburant circuit, etc.

Owing to this double arrangement the driver is certain that at the moment of starting, the thermostat being put in circuit it will operate the shutters proportionally to the heating of the water in the radiator. As long as the vehicle is running, the operation of the shutters is controlled by the temperature of the water contained in the radiator, and when it stops the thermostat being put automatically "out of circuit" by the driver (who applies the hand brake or cuts off the ignition, etc.) the shutters will close instantaneously in order to preserve the heat of the motor.

The movable thermostat body will be advantageously put in series with its driving device (by the driver) and with the transmitting device from the thermostat to the shutters. It will also be advantageous to place the body of the movable thermostat inside a tube, of cylindrical shape for example, in direct contact with the water in the radiator thus insuring the greatest possible conductivity of the thermostat.

The thermostat will preferably be returned from its "in circuit" position to its "out of circuit" position by the intermediary of the shutters' return spring.

A compensating spring may be utilized for taking up the excess run of the driving means that control the movement of the thermostat from one position to the other.

But in a preferred mode of execution an antagonistic spring designed to act against the spring that closes the shutter and which is more powerful than the latter is placed behind the thermostat body; said spring being compressed when the thermostat is put out of circuit so that in case of rupture of the driving wire the thermostat will always return "in circuit" of itself, and thus act as regulating device.

The driving means which control the movements of the thermostat as a unit may also be combined with a rod having a suitable length to produce forcibly the opening of the shutters when starting and their closing when the carriage stops.

The appended drawings show by way of examples various modes of execution of the object of my invention which comprises the utilization of the hand brake of the motor car.

Referring now more particularly to the characters of reference in Figs. 1 to 4 of the drawings, the numeral 1 denotes the thermostat body sliding without play in a cylinder 2 inserted between the radiator walls 3—3. 4 is the driving rod for the thermostat which extends more or less outside the thermostat body according to the degree of expansion or of contraction of the thermostatic substance contained therein. The rod is provided at its end with a push device 5 which may act upon a lever 6 pivoted at 7 when the thermostat is "in circuit"; one arm 6' of said lever being connected with the rod 8 which controls the incidence of the radiator shutters.

A lever 9 pivoted at 10 and connected at its other end to the wire 11 of a Bowden having its sheath 12 secured upon a support 13 acts through its head 9' upon the back portion of the thermostat body 1. The sheath 12 is secured at the other end of the Bowden to a stationary bearing 14 and the wire is secured by means of a compensating spring 15 to the end of a lever 16 pivoted at 17 which drives the hand brake by means of a system of rods 18.

Fig. 1 shows the thermostat in the "out of circuit" position that is to say the position in which it cannot in any case operate the shutters. The push device 5 comes to the position shown in this figure only when the vehicle has stopped for a certain time when the temperature has sufficiently cooled down.

Fig. 2 shows the thermostat in the "in circuit" position in which it has been brought by the release of the brake lever 16; the thermostat is ready to operate the shutters through its push device 5; the car is ready for starting.

Fig. 3 shows the thermostat still "in circuit" in the act of controlling the incidence of the shutters which it opens.

Figure 6:
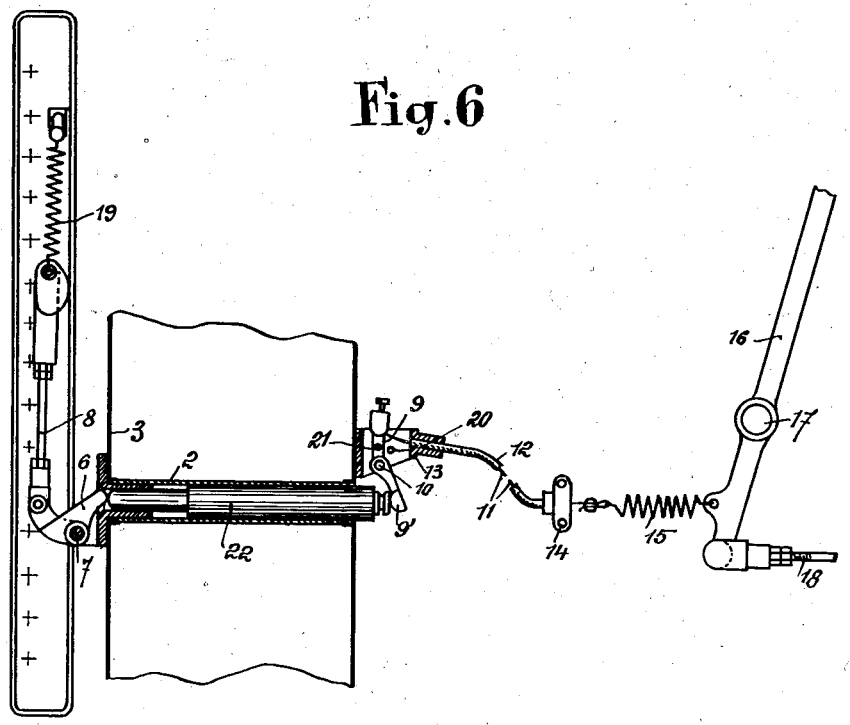

Fig. 4 shows the manner in which, the car being stationary and the brake lever having been actuated by the driver, the head 9' of lever 9 has been drawn backwards and the thermostat body 1 has also been brought "out of circuit" by the return spring 19 which continuously tends to return the lever 6—6' in the position indicated in Fig. 1 the spring 19 being more powerful than spring 15. In that position the thermostat cannot continue to operate the shutter as long as the brake remains applied. When the car has remained stationary for a certain length of time, the rod 4 moves back inside the thermostat and the push device 5 comes in the position shown in Fig. 1.

The support 13 is perforated with two holes 20 which allow the locking of the lever 9 (provided with a hole 21) in either of its end positions for example by means of a pan.

Fig. 5 shows a mode of execution of my invention which is remarkably advantageous: it comprises a spring 23 placed behind the thermostat body 1, which when the brake is released (Fig. 5) returns the back of the body 1 to a stationary position suitable for the operation of the thermostat. The position of the body is regulable by means of a stop constituted by two nuts 24 carried upon the rod which connects the body 1 with the wire 11 extending to the brake lever 16 above the pivotal axis 17.

Fig. 5 corresponds to the time when the car is moving, the thermostat piston 5 being then at a certain distance from the body 1 keeps the shutters open. When the driver applies the brake in order to stop the carriage the body 1 comes in the position "out of circuit" and compresses the spring 23. The reverse operation will return the body 1 to the position shown in Fig. 5. In the case of rupture of the wire 11 the thermostat body would nevertheless be returned to the "in circuit" position through the action of spring 23.

It will be understood that the resistance of the spring 23 must be such that when the piston 5 moves forward the spring which controls the return of the shutters stretches but that the spring 23 does no yield.

In the same manner and without departing from the limits of this invention, the thermostat body could be moved from its "out of circuit" position to its "in circuit" position through the operation of lighting the car or opening the carburant circuit or by any other operation executed by the driver when starting the carriage and involving the reverse operation when the latter stops.

Fig. 6 shows the same parts, they are indicated by similar characters of reference as previously. In this case the thermostat is replaced by a rod 22, sliding in the cylinder 2 and interposed exactly between the head 9' of lever 9 and the head of lever 6. The length of this rod is calculated so that when the brake is applied (Fig. 5) the shutters may close entirely under the action of spring 19 and that the head 9' may be moved backwards, so that on the brake being released the head 9' will force back the rod 22 thus causing the shutters to open in full.

Having now described and ascertained the nature of my invention and in what manner the same is to be performed I declare that what I claim is:

1. A device mounted upon a vehicle also provided with a pivoted brake lever, which comprises; a radiator provided with shutters, a spring to return the shutters to their position of closing, an oscillating lever connected with said spring, a thermostat designed to set on said lever against said spring when the temperature rises, said thermostat being slidably mounted in a tube which passes through the water contained in the radiator, a second oscillating lever comprising two arms, the first arm bearing upon the of the thermostat opposite that which acts upon the first lever and the second arm of the second oscillating lever being connected with the brake lever below the pivotal axis of the latter.

2. A device mounted upon a vehicle also provided with a pivoted brake lever, which comprises; a radiator provided with shutters, a spring to return the shutters to their position of closing, an oscillating lever connected with said spring, a thermostat designed to act on said lever against said spring when the temperature rises, said thermostat being slidably mounted in a tube which passes through the water contained in the radiator, a second oscillating lever comprising two arms, the first arm bearing upon the end of the thermostat opposite that which acts upon the first lever and the second arm of the second oscillating lever being connected with the brake lever on the vehicle below its pivotal axis by means of a transmission in which a spring, weaker than the return spring for the shutters, is inserted.

3. A device mounted upon a vehicle also provided with a pivoted brake lever, which comprises: a radiator provided with shutters, a spring to return the shutters to their position of closing, an oscillating lever connected with said spring, a thermostat designed to act on said lever against said spring when the temperature rises, said thermostat being slidably mounted in a tube which passes through the water contained in the radiator, another spring freely located behind the end of the thermostat opposite the one which acts upon the lever connected with the return spring of the shutters, a cover secured at the end of the aforesaid tube to serve as a support for this spring, a screwthreaded rod secured to that end of the thermostat and passing through said cover, nuts threaded upon said rod outside the cover in order to regulate the initial compression of the spring which bears upon the cover, and a transmission between said screwthreaded rod and a point of the brake lever of the vehicle above the pivotal axis of the latter, the resistance to the pressure upon the aforesaid spring being higher than the resistance of the spring controlling the return of the shutters.

4. A device for controlling the temperature of the motor of a vehicle which comprises a radiator for containing cooling water and having shutters, a spring connected to said shutters and tending to return them to closed position, a lever connected to said spring, a pivot for said lever, a thermostat for acting on the lever against the influence of the spring, a tube which passes through the water in the radiator, said thermostat being slidably mounted in the tube and being in operation in free contact with said lever, and a flexible connecting means between said thermostat and the brake lever of the vehicle, in such a manner that when the brake lever is applied, the spring is released and, contracting, closes the shutters again and pushes back the thermostat by means of the lever connected to the said spring, while when the brake lever is released, the thermostat is returned to a position in front of the lever connected to the spring, and is thus in position to actuate this lever and to open the shutters when the temperature rises.

GEORGES GASTON ROYER.